Dec. 11, 1923.

O. C. TRAVER 1,477,395

AUTOMATIC RECLOSING CIRCUIT BREAKER SYSTEM

Filed Jan. 19, 1922

Inventor:
Oliver C. Traver,
by Albert G. Davis
His Attorney.

Patented Dec. 11, 1923.

1,477,395

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed January 19, 1922. Serial No. 530,441.

*To all whom it may concern:*

Be it known that I, OLIVER C. TRAVER, a citizen of the United States, residing at Schenectady, in the county of Schenectady, State of New York, have invented certain new and useful Improvements in Automatic Reclosing Circuit-Breaker Systems, of which the following is a specification.

My invention relates to automatic reclosing circuit breaker systems and particularly to such systems in which a circuit breaker is arranged to connect automatically a source of direct current to a load circuit as soon as the conditions on the load circuit are such that the circuit breaker can be closed without overloading the source and has for its object the provision of a new and improved arrangement of apparatus for accomplishing this result.

In accordance with my invention the opening of the circuit breaker connects an auxiliary source of alternating current to the load circuit and the closing circuit of the circuit breaker is controlled by means of a contact-making watt responsive device which is connected so as to measure the number of watts supplied to the load circuit by the auxiliary source.

My invention will be better understood from the following description taken in connection with the accompanying drawings, and its scope will be pointed out in the appended claims.

Figure 1:
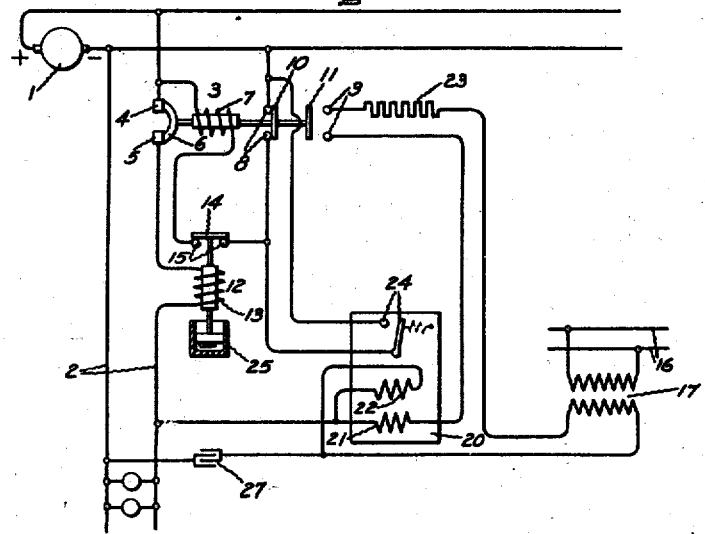
Figure 2:
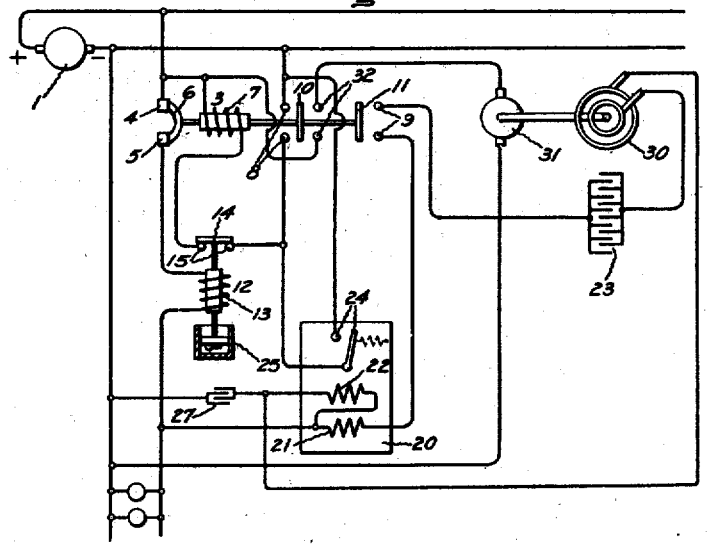

Referring to the drawings, Fig. 1 is a diagram showing an automatic reclosing circuit breaker system embodying my invention; and Fig. 2 is a modification of the arrangement shown in Fig. 1.

In the embodiment of my invention shown in Fig. 1, 1 represents any suitable source of direct current, such as a generator which is connected to a load circuit 2 by means of a circuit breaker 3 of any suitable type. As shown in the drawing, the circuit breaker comprises the main contact members 4 and 5 connected in series with one side of the load circuit 2, a main bridging member 6, a closing coil 7, auxiliary stationary contacts 8 and 9 and auxiliary movable contacts 10 and 11 for bridging the contacts 8 and 9 respectively. An overload relay 12, comprising a coil 13 connected in series with the load circuit 2, a movable contact 14 and stationary contacts 15, is provided for controlling the circuit of the closing coil 7.

16 represents any suitable source of alternating current which is adapted to be connected to the load circuit by means of the auxiliary contacts 9 and 11 of the circuit breaker when the circuit breaker is opened. As shown, a transformer 17 is interposed between the source 16 and the load circuit 2 as it is preferable to impress a comparatively low voltage across the load circuit when the circuit breaker is open. 20 represents a contact-making watt responsive device such as a watt relay which is responsive to the amount of energy supplied to the load circuit from the auxiliary source 16 and comprises a current coil 21 connected in series with the auxiliary source and a potential coil 22 connected across the load circuit. As it is desirable to keep the amount of energy lost in testing out the load circuit as small as possible I connect a current limiting impedance 23, such as a resistor, in series with the load circuit and the auxiliary source 16. The contacts 24 of the watt relay 20 are arranged to complete the circuit of the closing coil 7 when the number of watts consumed in the load circuit exceeds a predetermined value. In order to prevent direct current from flowing through the windings of the watt relay 20 and the auxiliary source it may be desirable to connect a condenser 27 in series therewith.

In order to allow a predetermined interval to elapse after the circuit breaker opens and before it can close again, I provide the overload relay 12 with a time limit device 25 of any suitable construction. As shown in the drawing, this time limit device consists of a dash pot which is designed in a well known manner so that the relay contacts may be opened either instantly or a predetermined interval after an overload occurs on the load circuit 2, but does not close its contacts until a predetermined interval after the winding 13 is deenergized. The dash pot may, however, be arranged in any well known manner so as to delay both the opening and the closing of the relay contacts if it is so desired.

The operation of the system shown in Fig. 1 is as follows:—When the circuit breaker is closed it is held in its closed position by the energization of the closing coil 7, the circuit of which is completed from one side of the generator 1 through the winding 7, contacts 14 and 15 of the overload relay 12, auxiliary contacts 8 and 10 of the circuit breaker to the opposite side of the generator 1. Since the auxiliary contacts 9 and 11 are open, the auxiliary source 16 is disconnected from the load circuit 2.

As long as the load on the load circuit remains below a predetermined value, the contacts 14 and 15 of the overload relay remain closed. When, however, the load exceeds this predetermined value, the overload relay 12 opens its contacts thereby deenergizing the closing coil 7 and causing the circuit breaker to open.

When the circuit breaker is in its open position the auxiliary contacts 8 and 10 are open and the contacts 9 and 11 are closed thereby connecting the auxiliary source 16 to the load circuit 2 through the current limiting resistor 23. The watt relay 20 now measures the watts consumed by the load. If the resistance of the short circuit is low the number of watts consumed is small as the voltage across the load circuit is practically zero. As the load resistance increases, the watts consumed in the load increases so that the force tending to close the contacts 24 of the watt relay 20 also increases. When the load resistance reaches a predetermined value, the watt relay closes its contacts 24 and completes a circuit for the closing coil 7 from one side of the generator 1 through coil 7, overload relay contacts 14 and 15, watt relay contacts 24 to the opposite side of the generator 1. The energization of the closing coil 7 closes the circuit breaker and completes a holding circuit for itself through the auxiliary contacts 8 and 10 and disconnects the auxiliary source 16 from the load circuit by opening the auxiliary contacts 9 and 11.

One advantage in using a watt responsive device in the manner above described instead of a voltmeter connected across the load circuit is that the voltmeter does not give a true indication of the load resistance when an alternating current flows through the load circuit because of the reactance of the circuit, whereas a watt responsive device only responds to the amount of alternating current energy consumed in the resistance of the load circuit. Therefore, it is evident that the watt responsive device gives a true indication of the load resistance which obviously is the only thing that controls the direct current supplied to the load circuit from the direct current source 1 when the circuit breaker is closed.

The modification of my invention shown in Fig. 2 is similar to the arrangement shown in Fig. 1 except that the auxiliary alternating current source is shown as an alternator 30 driven by a motor 31 which is adapted to be connected to the source 1 by means of the auxiliary contacts 10 and 32 when the circuit breaker is opened. The impedance 23 in this modification is shown as a condenser. Otherwise the system shown in this figure is the same as that shown in Fig. 1 and therefore it is believed that the operation of this modification will be obvious from the description given above.

While I have shown and described several embodiments of my invention, I do not desire to be limited to the exact arrangement shown and described, but seek to cover in the appended claims all those modifications that fall within the true spirit and scope of my invention.

What I claim as new and desire to secure by Letters Patent of the United States, is:—

1. In an automatic reclosing circuit breaker system the combination with a supply circuit, a load circuit connected to said supply circuit, a circuit breaker adapted to control the connection between said supply circuit and said load circuit and closing means for said circuit breaker of an auxiliary source of alternating current, means adapted to connect said auxiliary source to said load circuit upon the opening of said breaker and means responsive to the watts supplied to said load circuit from said auxiliary source for controlling said closing means.

2. In an automatic reclosing circuit breaker system, the combination with a supply circuit, a load circuit connected to said supply circuit, a circuit breaker adapted to control the connection between said supply circuit and said load circuit and closing means for said circuit breaker, of an impedance, an auxiliary source of alternating current, means adapted to connect said auxiliary source in series with said impedance and said load circuit upon the opening of said circuit breaker, and a watt responsive device responsive to the watts supplied to said load circuit from said auxiliary source for controlling said closing means.

3. In an automatic reclosing circuit breaker system, the combination with a supply circuit, a load circuit connected to said supply circuit, a circuit breaker adapted to control the connection between said supply circuit and said load circuit and closing means for said circuit breaker, of an impedance, an auxiliary source of alternating current, means adapted to connect said auxiliary source in series with said impedance and said load circuit upon the opening of said circuit breaker, and a contact making wattmeter for controlling said closing means having its current coil connected in series with said auxiliary source, impedance and load circuit and its potential coil connected across said load circuit.

4. In an automatic reclosing circuit breaker system, the combination with a supply circuit, a load circuit connected to said supply circuit, a circuit breaker adapted to control the connection between said supply circuit and said load circuit and a closing coil adapted to close said circuit breaker upon the energization thereof, of means responsive to an overload on said load circuit for effecting the opening of said breaker, an impedance, an auxiliary source of alternating current, means adapted to connect said auxiliary source in series with said impedance and said load circuit upon the opening of said circuit breaker, and a contact making watt meter responsive to the watts supplied to said load circuit from said auxiliary source for controlling the circuit of said closing coil.

In witness whereof, I have hereunto set my hand this 18th day of January, 1922.

OLIVER C. TRAVER.